US007484040B2

(12) United States Patent
Deicke et al.

(10) Patent No.: US 7,484,040 B2
(45) Date of Patent: Jan. 27, 2009

(54) HIGHLY AVAILABLE REMOVABLE MEDIA STORAGE NETWORK ENVIRONMENT

(75) Inventors: Juergen Deicke, Weiterstadt (DE); Leonard G. Jesionowski, Tucson, AZ (US); Wolfgang Mueller, Meisenheim (DE)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 11/125,709

(22) Filed: May 10, 2005

(65) Prior Publication Data

US 2006/0259688 A1 Nov. 16, 2006

(51) Int. Cl.
G06F 12/16 (2006.01)
G06F 9/44 (2006.01)
G11B 5/09 (2006.01)

(52) U.S. Cl. .......................... 711/115; 719/321; 360/53
(58) Field of Classification Search ........................ None
See application file for complete search history.

(56) References Cited

U.S. PATENT DOCUMENTS

| | | | |
|---|---|---|---|
| 4,769,782 A | | 9/1988 | Iwanaga |
| 5,212,772 A | | 5/1993 | Masters |
| 5,347,407 A | * | 9/1994 | Solhjell et al. ................ 360/53 |
| 5,546,533 A | | 8/1996 | Koyama |
| 5,630,076 A | | 5/1997 | Saulpaugh et al. |
| 5,802,365 A | | 9/1998 | Kathail et al. |
| 5,832,522 A | | 11/1998 | Blickenstaff et al. |
| 6,038,379 A | | 3/2000 | Fletcher et al. |
| 6,154,850 A | | 11/2000 | Idleman et al. |
| 6,279,074 B1 | | 8/2001 | Pence |
| 6,334,195 B1 | | 12/2001 | DeKoning et al. |
| 6,401,214 B1 | | 6/2002 | Li |
| 6,487,644 B1 | | 11/2002 | Huebsch et al. |
| 6,604,160 B1 | | 8/2003 | Le et al. |
| 6,728,831 B1 | | 4/2004 | Bridge |
| 6,763,438 B2 | | 7/2004 | Ogawa et al. |
| 6,766,412 B2 | * | 7/2004 | Bolt ........................... 711/111 |

(Continued)

FOREIGN PATENT DOCUMENTS

WO   WO 2004/061642 A2   7/2004

OTHER PUBLICATIONS

IBM Technical Disclosure Bulletin vol. 35 No. 3 Aug. 1992, pp. 399-405.

(Continued)

*Primary Examiner*—Hyung Sough
*Assistant Examiner*—Duc T Doan
(74) *Attorney, Agent, or Firm*—Konrad Raynes & Victor LLP

(57) ABSTRACT

A method for a removable media storage network environment that employs a media management system for managing a removable media system on behalf of client applications, and a media management agent to enhance the management of the removable media system by the media management system. The media management agent operates to determine an operational state of the removable media system, and to enhance an availability and a performance of the removable media system as managed by a media management system, wherein one or more one error recovery techniques are conditionally initiated based on the determined operational state of the removable media system and wherein the media management system is conditionally reconfigured based on the determined operational state of the removable media system.

1 Claim, 9 Drawing Sheets

U.S. PATENT DOCUMENTS

| | | |
|---|---|---|
| 7,075,874 B2 * | 7/2006 | Rushton et al. .......... 369/53.21 |
| 7,171,671 B2 * | 1/2007 | Snead et al. ................ 719/321 |
| 7,366,800 B2 | 4/2008 | Flynn, Jr. |
| 2002/0144044 A1 | 10/2002 | Moon et al. |
| 2003/0002405 A1 | 1/2003 | Linder |
| 2003/0046490 A1 | 3/2003 | Busser et al. |
| 2003/0074378 A1 | 4/2003 | Midgley et al. |
| 2004/0044770 A1 | 3/2004 | Messick et al. |

OTHER PUBLICATIONS

IBM Technical Disclosure Bulletin vol. 37 No. 10 Oct. 1994, pp. 209-210.

IEEE-SA Standards Board IEEE Standard for Media Management Systems Architecture IEEE STD 1244.1-2000 Jun. 21, 2000.

IEEE-SA Standards Board IEEE Standard for Media Management System Media Management Protocol IEEE STD 1244.3-2000 Jun. 21, 2000.

* cited by examiner

US 7,484,040 B2

HIGHLY AVAILABLE REMOVABLE MEDIA STORAGE NETWORK ENVIRONMENT

FIELD OF INVENTION

The present invention generally relates to the management of removable media. The present invention specifically relates to managing removable media in a manner that achieves a high availability of the removable media to client applications, an effective load balancing of the removable media, and an efficient error recovery of removable media.

BACKGROUND OF THE INVENTION

A Media Management System ("MMS") is a distributed, multi-platform system for managing removable media either in the form of computer media (e.g., magnetic tape, optical disk, and CD-ROM) or in the form of non-computer media (e.g., audiotape, video tape, file, audio CDs and videodiscs). IEEE standards for the MMS define a software component model for working with the removable media as well as a number of protocols that define interfaces between the various software components of the MMS. These standards enable vendors to construct applications that use removable media as well as components of a MMS that interoperate with other MMS components.

MMSs are more and more becoming the central interface for accessing removable media in a storage networking environment. As such, a MMS has to be highly available in order to provide access to the removable media whenever it is needed. This can be achieved with various known techniques (e.g., load balancing and error recovery). A challenge therefore for the removable media storage industry is to implement a highly available removable media storage network environment employing a MMS in accordance with the IEEE standards.

SUMMARY OF THE INVENTION

One form of the present invention is signal bearing medium tangibly embodying a program of machine-readable instructions executable by at least one processor to perform operations to enhance a management of a removable media system by a media management system. The operations comprise a determination of an operational state of the removable media system, and an enhancement of an availability and a performance of the removable media system as managed by the media management system, wherein one or more one error recovery techniques are conditionally initiated based on the determined operational state of the removable media system and wherein the media management system is conditionally reconfigured based on the determined operational state of the removable media system.

A second form of the present invention is a system comprising at least one processor and at least one memory storing instructions operable with the processor(s) for enhancing a management of a removable media system by a media management system. The instructions are executed for determining an operational state of the removable media system, and an enhancing an availability and a performance of the removable media system as managed by the media management system, wherein one or more one error recovery techniques are conditionally initiated based on the determined operational state of the removable media system and wherein the media management system is conditionally reconfigured based on the determined operational state of the removable media system.

A third form of the present invention is method comprising a determination of an operational state of the removable media system, and an enhancement of an availability and a performance of the removable media system as managed by the media management system, wherein one or more one error recovery techniques are conditionally initiated based on the determined operational state of the removable media system and wherein the media management system is conditionally reconfigured based on the determined operational state of the removable media system.

The forgoing forms and other forms, objects, and aspects as well as features and advantages of the present invention will become further apparent from the following detailed description of the various embodiments of the present invention, read in conjunction with the accompanying drawings. The detailed description and drawings are merely illustrative of the present invention, rather than limiting the scope of the present invention being defined by the appended claims and equivalents thereof.

DESCRIPTION OF THE PRESENT INVENTION

Figure 1:
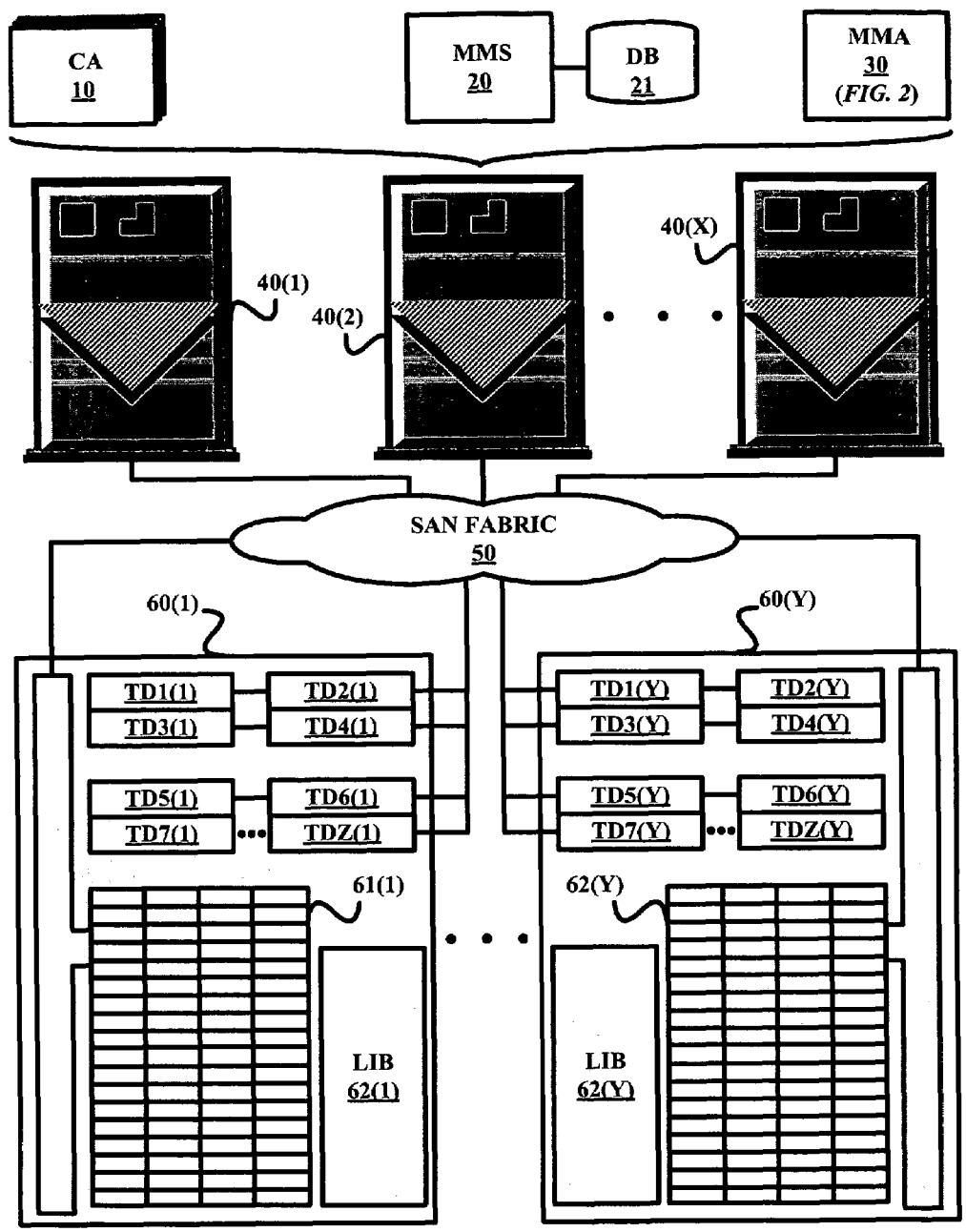
FIG. 1 illustrates an exemplary removable media storage networking environment for practicing the present invention.

FIG. 1 illustrates an exemplary removable media storage networking environment for practicing the present invention. Referring to FIG. 1, the present invention provides a new and unique media management agent ("MMA") 30 that enhances the capabilities of a media management system ("MMS") 20 and its associated database 21 in facilitating a high availability of a Y number of registered tape systems 60 for one or more client applications ("CA") 10 to implement data I/O functions and to allocate, mount, unmount and deallocate volumes, where $Y \geq 1$. To this end, client application(s) 10, media management system 20 and media management agent 30 are distributed among an X number of storage management servers 40, where $X \geq 1$. Further, server(s) are physically connected via a storage area network ("SAN") fabric 50 to the Y number of tape systems 60. Each tape system 60 employs a Z number of tape drives TD for up to Z number of tape cartridges from a respective tape cartridge pool 61, where $Z \geqq 1$, and a library 62.

In one embodiment, as is well known in the art, media management system 20 employs one or more software managers serving a central repository for metadata that describes the tape drives of tape system(s) 60, the tape cartridges of tape system(s) 60, client application(s) 10, libraries 62 of tape system(s) 60, and the usage history of media management system 30. Additionally, the software manager(s) of media management system 20 facilitate access by client application(s) 10 to tape system(s) 60, and arbitrate competing demands by client application(s) 10 for tape system(s) 60.

An operation of media management agent 30 will now be described herein in connection with FIGS. 2 and 3. From this description, those having ordinary skill in the art of the present invention will appreciate the various advantages and benefits of media management agent 30 in enhancing media management system 20 and its associated database 21 in facilitating a high availability and performance of tape system(s) 60 for client application(s) 10. Additionally, those having ordinary skill in the art of the present invention will appreciate the applicability of media management agent 30 to other forms of removable media systems (e.g., optical disk systems).

Figure 2:
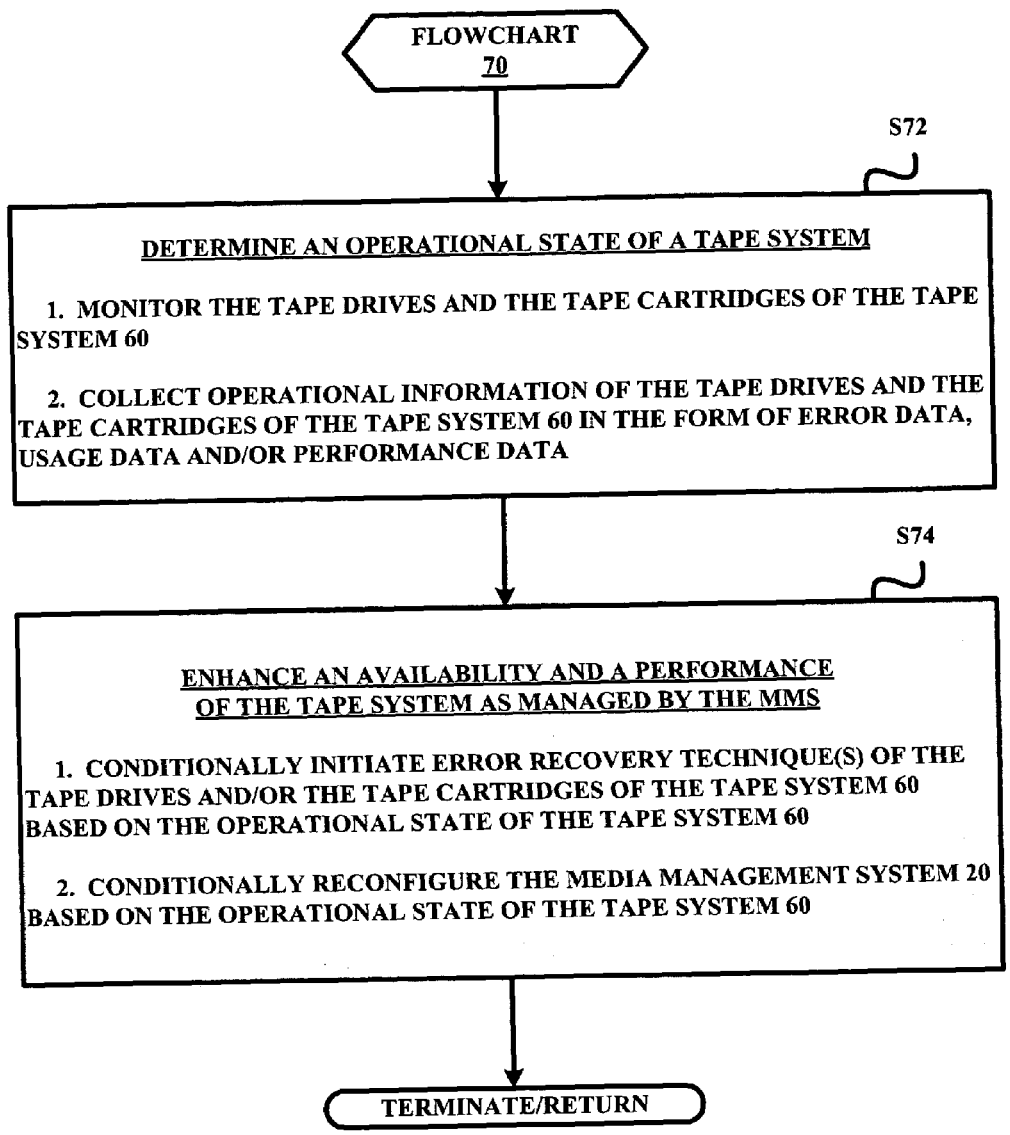
FIG. 2 illustrates a flowchart representative of one embodiment of a media management agent operation method in accordance with the present invention.

Referring to FIG. 2, media management agent 30 implements a flowchart 70 to enhance media management system 20 and its associated database 21 in facilitating a high availability and performance of an assigned tape system 60 for client application(s) 10. A stage S72 of flowchart 70 encompasses media management agent 30 determining an operational state of the assigned tape system 60. In one embodiment of stage S72, media management agent 30 monitors the tape drives and tape cartridges of the assigned tape system 60. Additionally, media management agent 30 collects operational information OINFO as illustrated in FIG. 3 via standard storage network interfaces (e.g., Fiber Channel, SCSI and iSCSI) whereby the operational information OINFO is related, directly or indirectly, to the monitored tape drives and tape cartridges of the assigned tape system 60. Operational information OINFO is in the form of error data, usage data and/or performance data that is related, directly and/or indirectly, to the monitored tape drives and tape cartridges of the assigned tape system 60.

A stage S74 of flowchart 70 encompasses media management agent 30 enhancing the availability and performance of the assigned tape system 60 for client application(s) 10 as managed by media management system 20. In one embodiment of stage S74, media management agent 30 conditionally initiates one or more error recovery techniques of the tape drives and/or the tape cartridges of the assigned tape system 60 based on the determined operational state of the assigned tape system 60. For example, media management agent 30 can use the operational information OINFO to detect trends and/or faults in the assigned tape system 60 that is resulting or may result in an unacceptable availability and/or performance of the assigned tape system 60 to thereby initiate error recovery techniques of the tape drives and/or the tape cartridges of the assigned tape system 60 in response to a detection of such trends and/or faults.

Figure 3:
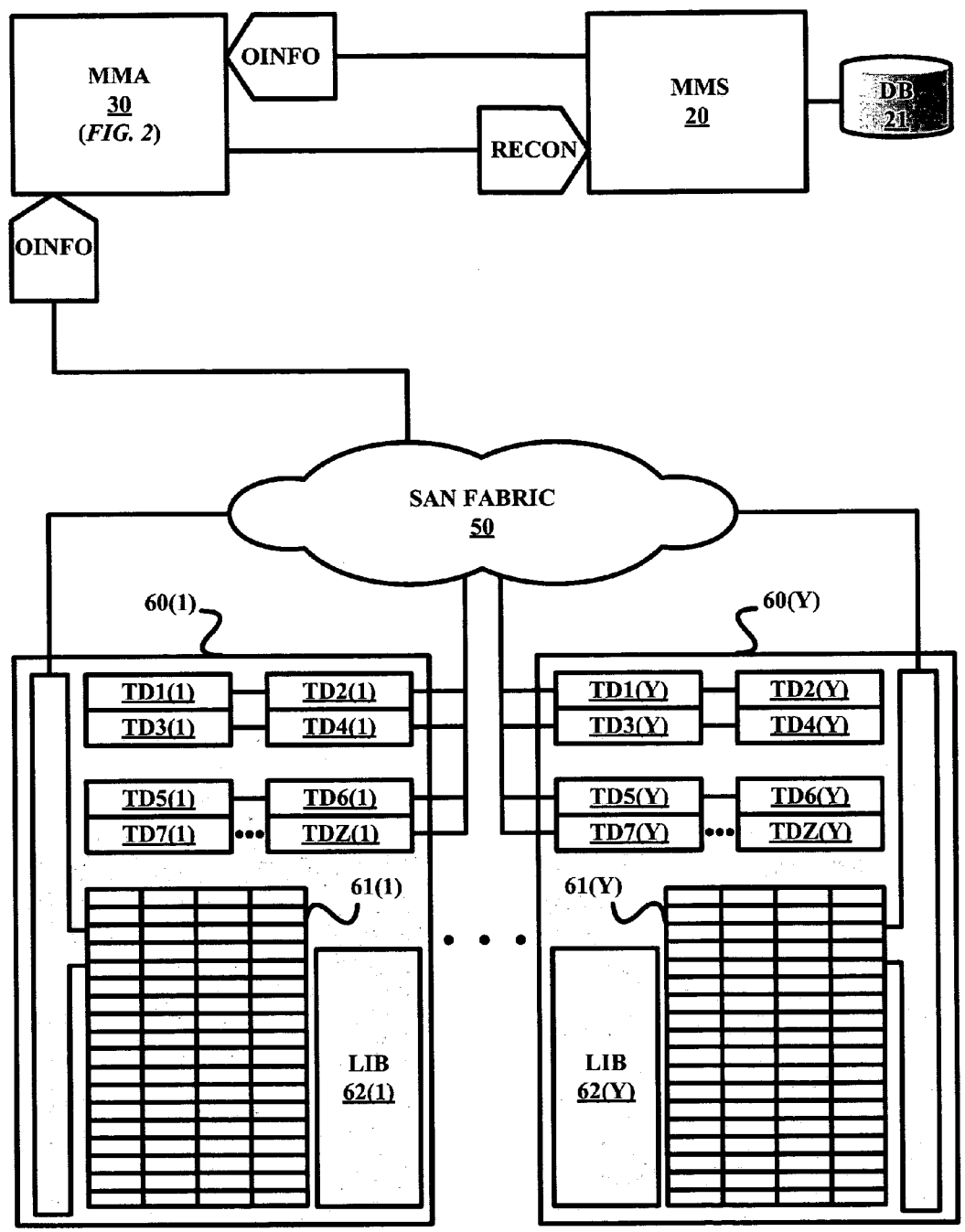
FIG. 3 illustrates an exemplary operation of the removable media storage networking environment illustrated in FIG. 1 in accordance with the flowchart illustrated in FIG. 2.

Additionally, media management agent 30 conditionally issues reconfiguration commands RECON as illustrated in FIG. 3 to reconfigure media management system 20 based on the determined operational state of the assigned tape system 60. For example, media management agent 30 can set or cause to be set various object attributes and parameters of media management system 20 based on operational information OINFO of the assigned tape system 60 (e.g., priority of the assigned tape system 60 and access routes from client application(s) 10 to the assigned tape system 60).

In practice, the manner by which media management agent 30 executes this embodiment of stage S74 is without limit. Thus, the following description in connection with FIGS. 4-9 of various methods implemented by media management agent 30 during stage S74 is not a limitation as to the scope of stage S74.

Figure 4:
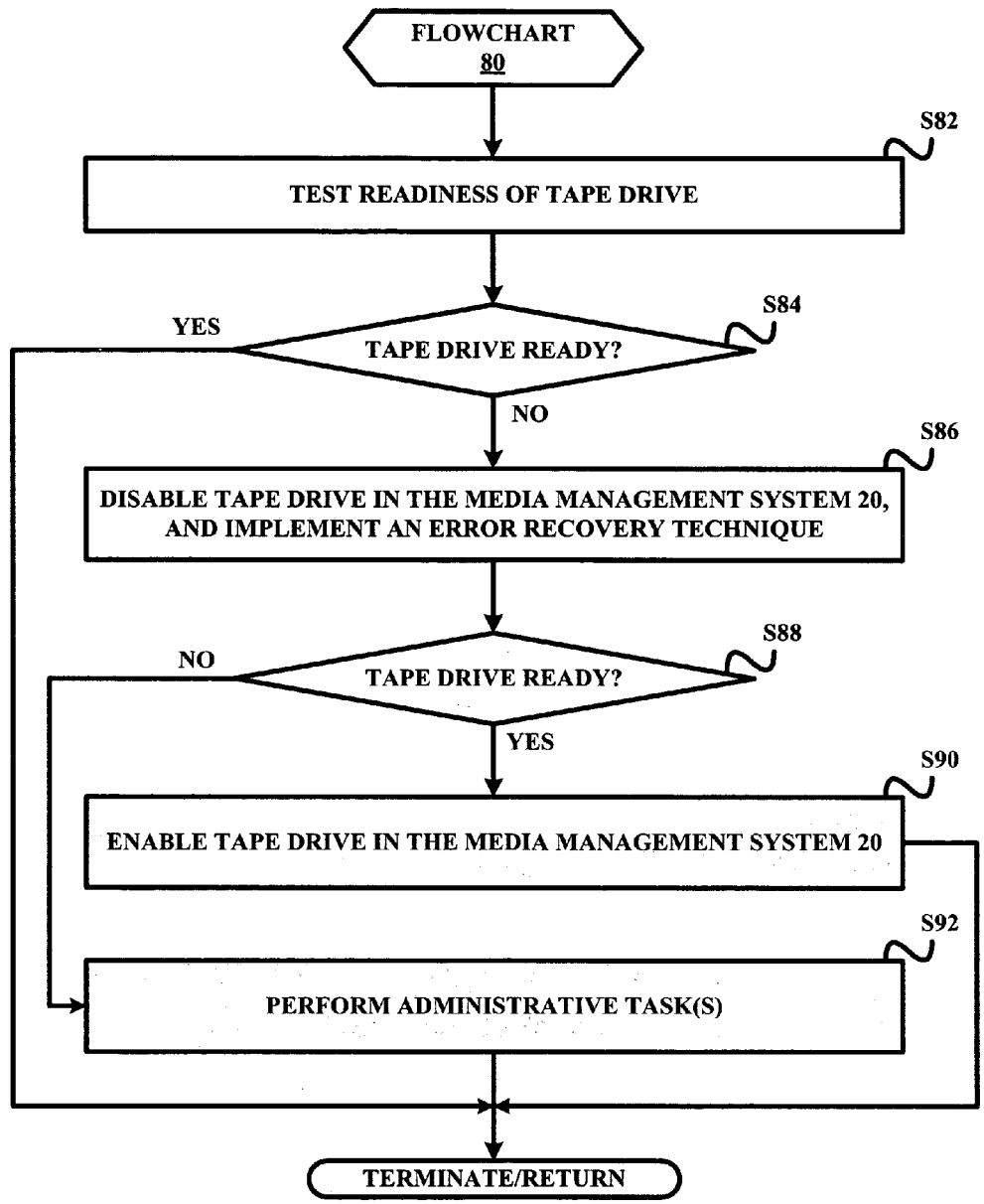
FIG. 4 illustrates a flowchart representative of one embodiment of tape drive readiness test method in accordance with the present invention.

FIG. 4 illustrates a flowchart 80 representative of a tape drive readiness test method of the present invention. Referring to FIGS. 1 and 4, a stage S82 of flowchart 80 encompasses media management agent 30 testing a readiness of a tape drive of the assigned tape system 60. If media management agent 30 decides during a stage S84 of flowchart 80 that the tape drive is operationally ready to be accessed by client application(s) 10, then media management agent 30 proceeds to terminate flowchart 80 or return to stage S82 to test the readiness of another tape drive of the assigned tape system 60. Otherwise, during a stage S86 of flowchart 80, media management agent 30 commands media management system 20 to disable the tape drive in media management system 20 and implements a conventional error recovery technique for the disabled tape drive.

If media management agent 30 decides during a stage S88 of flowchart 80 that the tape drive is operationally ready to be accessed by a client application 10 after an implementation of the error recovery technique, then media management agent 30 proceeds to a stage S90 of flowchart 80 to command media management system 20 to enable the error recovered tape drive in media management system 20, and subsequently terminates flowchart 80 or returns to stage S82 to test the readiness of another tape drive of the assigned tape system 60. Otherwise, during a stage S92 of flowchart 80, media management agent 30 performances any necessary administrative tasks to facilitate a repair of the disabled tape drive, such as, for example, contact a storage network administrator.

Figure 5:
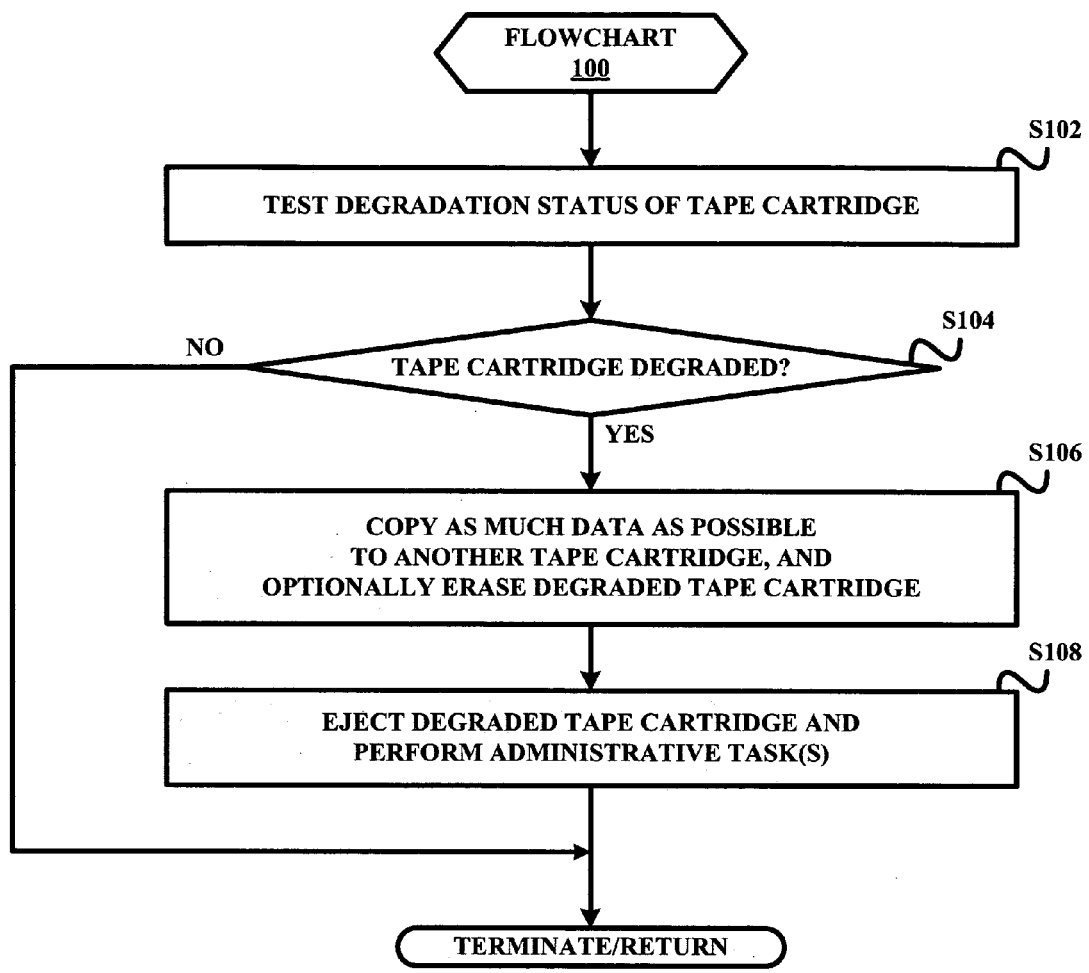
FIG. 5 illustrates a flowchart representative of one embodiment of a tape degradation management method in accordance with the present invention.

FIG. 5 illustrates a flowchart 100 representative of a tape cartridge degradation method of the present invention. Referring to FIGS. 1 and 5, a stage S102 of flowchart 100 encompasses media management agent 30 testing a degradation status of a mounted tape cartridge of the assigned tape system 60. If media management agent 30 decides during a stage S104 of flowchart 100 that the tape cartridge is not degraded to the extent that makes the data on tape cartridge inaccessible by client application(s) 10, then media management agent 30 proceeds to terminate flowchart 100 or return to stage S102 to test a degradation status of another mounted tape cartridge of the assigned tape system 60. Otherwise, during stages S106 and S108 of flowchart 100, media management agent 30 copies as much of the data stored on the degraded tape cartridge as possible to a sound mounted tape cartridge of the assigned tape system 60, optionally erases the copied data from the degraded tape cartridge, ejects the degraded tape cartridge from its corresponding tape drive, and performs any necessary administrative tasks. Thereafter, media management agent 30 proceeds to terminate flowchart 100 or return to stage S102 to test a degradation status of another mounted tape cartridge of the assigned tape system 60.

Figure 6:
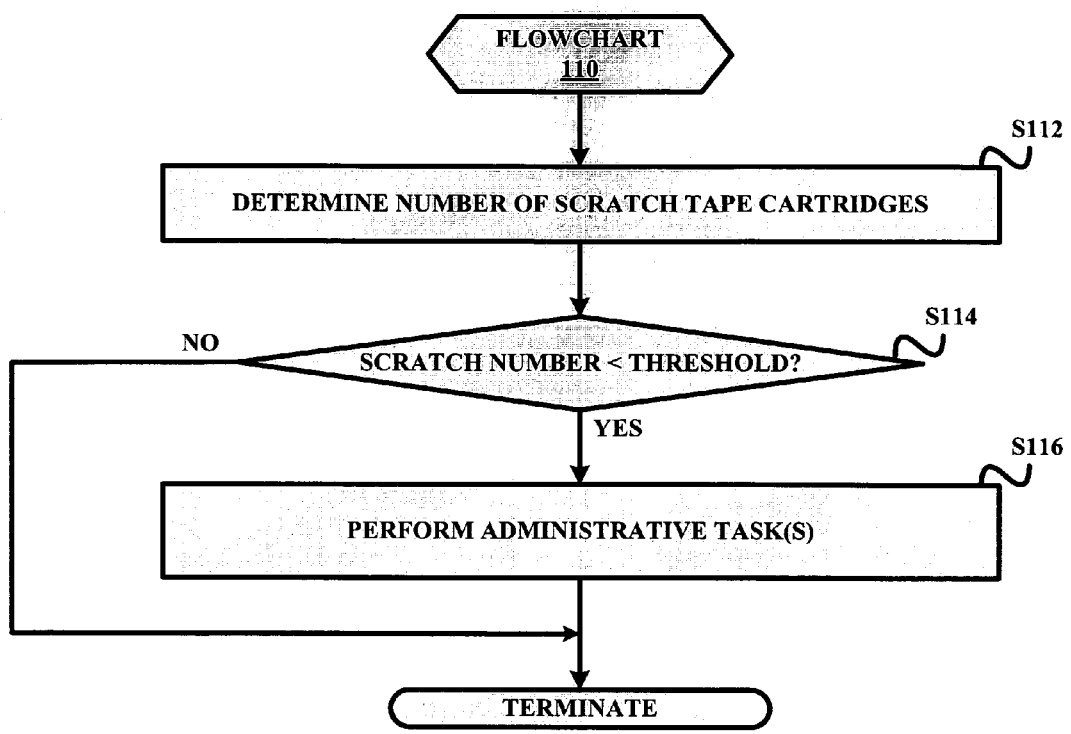
FIG. 6 illustrates a flowchart representative of one embodiment of a scratch tape pool management method in accordance with the present invention.

FIG. 6 illustrates a flowchart 110 representative of a scratch tape pool management method of the present invention. Referring to FIGS. 1 and 6, stage S112 of flowchart 110 encompasses media management agent 30 determining a number of scratch tape cartridges among the tape pool 61 of the assigned tape system 60. If media management agent 30 decides during a stage S114 of flowchart 110 that the number of scratch tape cartridges among tape pool 61 of the assigned tape system 60 is equal to or greater than a predetermined threshold, then media management agent 30 proceeds to terminate flowchart 110. Otherwise, during a stage S116 of flowchart 110, media management agent 30 performs any necessary administrative tasks to ensure that more scratch cartridges become available for the assigned tape system 60. Thereafter, media management agent 30 proceeds to terminate flowchart 100.

Figure 7:
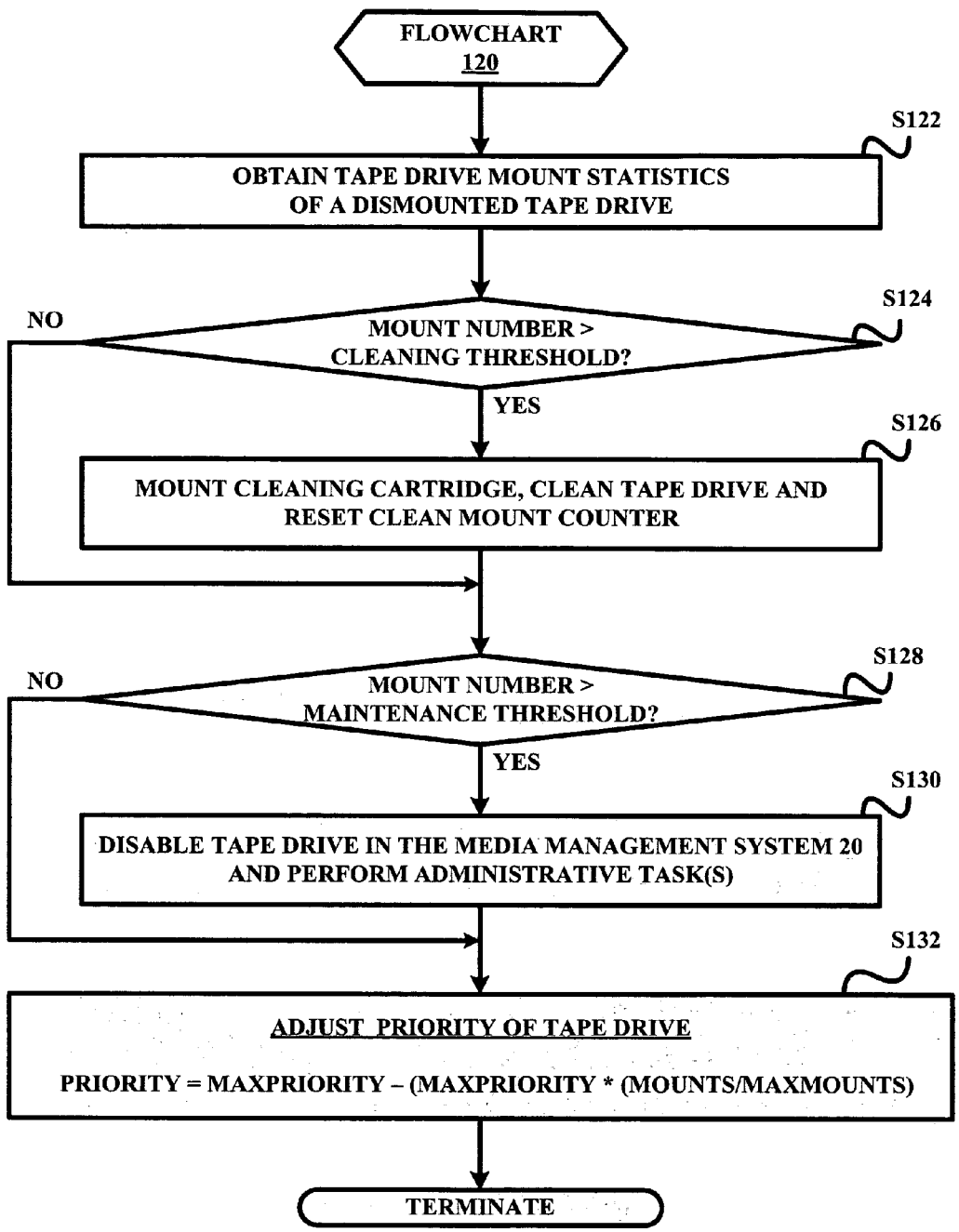
FIG. 7 illustrates a flowchart representative of one embodiment of a tape drive mount management method in accordance with the present invention.
Figure 8:
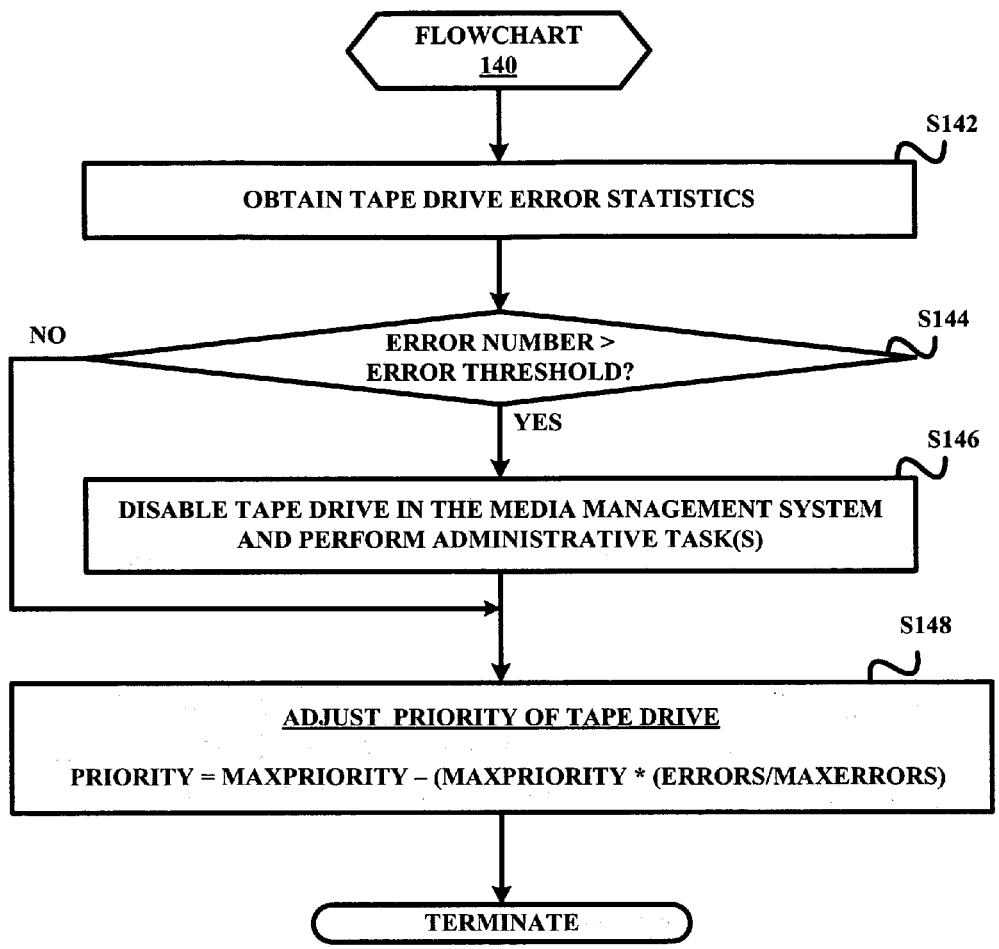
FIG. 8 illustrates a flowchart representative of one embodiment of a tape drive error management method in accordance with the present invention.

FIG. 7 illustrates a flowchart 120 representative of a tape drive mount management method of the present invention, and FIG. 8 illustrates a flowchart 140 representative of a tape drive mount management method of the present invention. These methods are related to a priority allocated to the assigned tape system 60 for purposes of distributing a workload among all available tape drives of tape system(s) 60. In particular, media management system 20 will allocate a priority attribute for the tape drives of tape system(s) 60 whereby tape drives with a higher priority will be used in mount operations in favor of tape drives with a lower priority.

Referring to FIGS. 1 and 7, a stage S122 of flowchart 120 encompasses media management agent 30 obtaining statistics indicative of a number of mounts of a dismounted tape drive of the assigned tape system 60. Thereafter, during a stage S126 of flowchart 120, media management agent 30 will mount a cleaning cartridge in the tape drive, clean the tape drive and reset a clean mount counter if media management agent 30 decided during a stage S124 that the number of mounts of the tape drive exceeded a predetermined cleaning threshold. Subsequently, during a stage S130 of flowchart 120, media management agent 30 will command media management system 20 to disable the tape drive in media management system 20 and perform any necessary administrative tasks if media management agent 30 decided during a stage S128 of flowchart 120 that the number of mounts of the tape drive exceeded a predetermined maintenance threshold.

After conditionally executing or not executing stages S126 and S128, media management agent 30 will command media management system 20 to adjust the priority of the tape drive. In one embodiment, the priority of the tape drive is adjusted by a calculating the priority as a difference between a maximum priority ("maxpriority") of the tape drive and a mount factor of the tape drive, which is based on a difference of the maximum priority of the tape drive and a ratio of the number of recorded mounts of the tape drive to a maximum allowable number of mounts of the tape drive ("maxpriority−(mounts/maxmounts)"). Thereafter, media management agent 30 terminates flowchart 120.

Referring to FIGS. 1 and 8, a stage S142 of flowchart 140 encompasses media management agent 30 obtaining statistics indicative of a number of errors of a dismounted tape drive of the assigned tape system 60. Thereafter, during a stage S146 of flowchart 140, media management agent 30 will disable the tape drive in media management system 20 and perform any necessary administrative tasks if media management agent 30 decided during a stage S144 of flowchart 150 that the number of errors of the tape drive exceeded a predetermined error threshold.

After conditionally executing or not executing stage S146, media management agent 30 will command media management system 20 to adjust the priority of the tape drive. In one embodiment, the priority of the tape drive is adjusted by a calculating the priority as a difference between a maximum priority ("maxpriority") of the tape drive and an error factor of the tape drive, which is based on a difference of the maximum priority of the tape drive and a ratio of the number of recorded errors of the tape drive to a maximum allowable number of errors of the tape drive ("maxpriority−(errors/maxerrors)"). Thereafter, media management agent 30 terminates flowchart 120.

Referring to FIGS. 7 and 8, media management agent 30 may be structurally configured to implement respective flowcharts 120 and 140 as needed. As such, the priority adjustment of a tape drive under flowcharts 120 and 140 can involve a synergism of stages S132 and S148 as would be appreciated by those having ordinary skill in the art.

Figure 9:
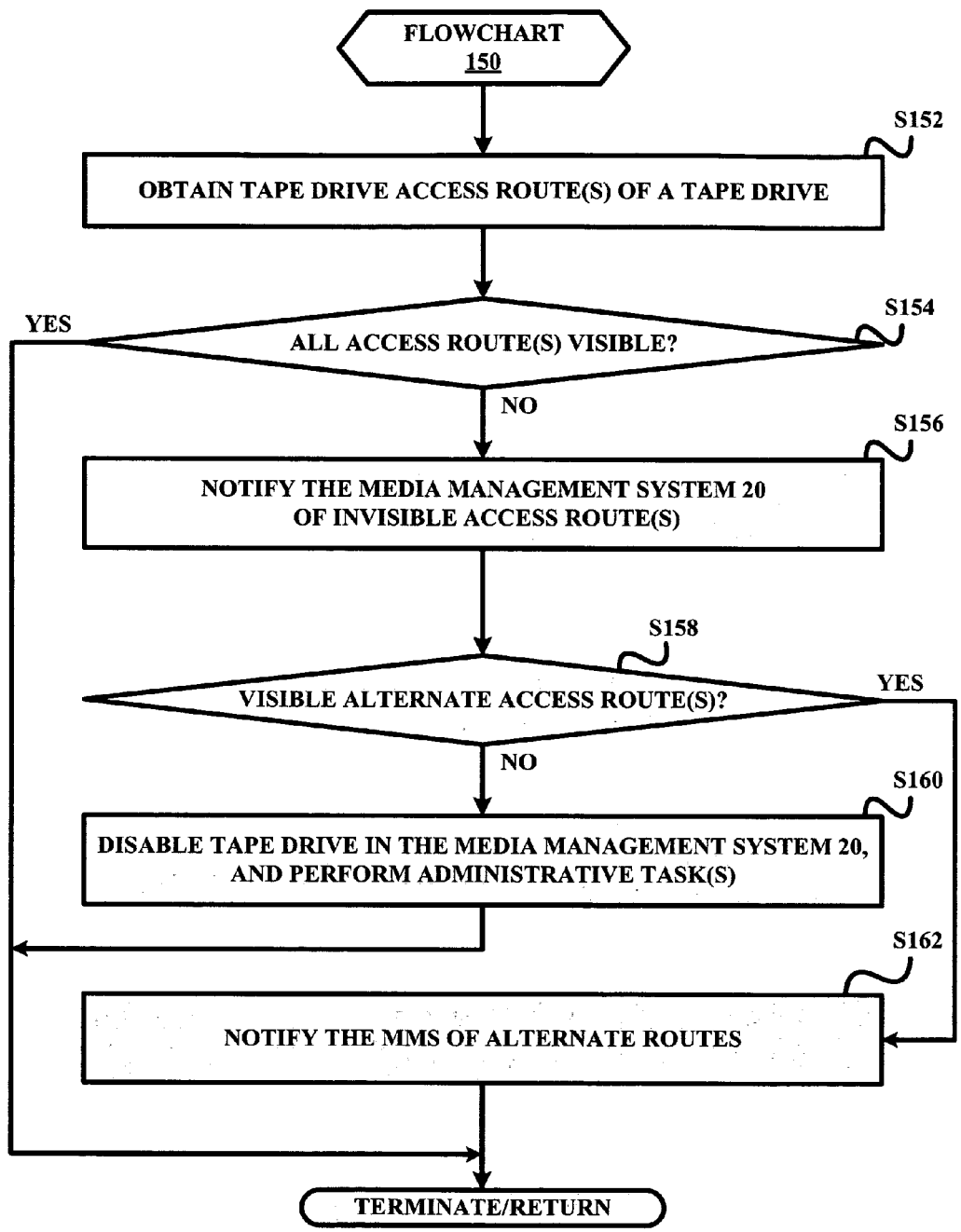
FIG. 9 illustrates a flowchart representative of one embodiment of a tape drive access route management method in accordance with the present invention.

FIG. 9 illustrates a flowchart 150 representative of a tape drive access route method of the present invention. Referring to FIGS. 1 and 9, a stage S152 of flowchart 150 encompasses media management agent 30 obtaining statistics indicative of each access route from one of the servers 40 via SAN fabric 50 to a tape drive TD of the assigned tape system 60. If media management agent 30 decides during a stage S156 of flowchart 150 that at lease one access route is visible, then media management agent 30 terminates flowchart 150 or returns to stage S152 to obtain access route statistics on another tape drive TD of the assigned tape system 60. Otherwise, media management agent 30 proceeds to a stage S156 of flowchart 150 to notify media management system 20 of each invisible access route.

If media management agent 30 decides during a stage S158 of flowchart 150 that one or more visible alternate routes from one of the servers 40 via SAN fabric 50 to the tape drive TD of the assigned tape system 60 does exist, then media management agent 30 proceeds to a stage S162 of flowchart 160 to notify media management system 20 of the visible alternative route(s). Otherwise, media management agent 30 proceeds to a stage S160 of flowchart 150 to disable the tape drive in media management system 20 and perform any necessary administrative tasks. After executing either stage S160 or stage S162, media management agent 30 terminates flowchart 150 or returns to stage S152 to obtain access route statistics on another tape drive of the assigned tape system 160.

Referring to FIGS. 2-9, the various methods of the present invention were described herein in the context of a media management agent 30 being assigned to a single tape system 60 for purposes of facilitating an understanding of the present invention. In practice, a media management agent 30 can be assigned to multiple tape systems 60.

Furthermore, media management agent 30 can implement the various methods of the present invention on a continual basis, a periodic basis, an intermittent basis, or an event basis. For example, media management agent 30 can register with media management system 20 to be notified when a tape cartridge has been unmounted from an assigned tape system 60 whereby media management agent 30 will sequentially implement flowchart 80 (FIG. 4), flowchart 120 (FIG. 7), flowchart 140 (FIG. 8) and flowchart 150 (FIG. 9) in response to receiving such a notification.

Referring to FIG. 1, in a practical embodiment, media management system 20 and media management agent 30 are embodied as software modules written in a conventional language and installed within a memory of a single server 40 or memories of different servers 40 whereby the server processor(s) can execute media management system 20 and media management agent 30 to perform various operations of the present invention as described in connection with the illustrations of FIGS. 2-9.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for managing a removable media system by a media management system, the method comprising:

determining a readiness of a tape drive in the removable media system;

initiating at least one error recovery technique based on the determined readiness;

wherein initiating the at least one error recovery technique includes disabling the tape drive based on the determined readiness, implementing the error recovery technique based on the disabling, and enabling the tape drive based on the implementing;

determining a tape degradation status of a tape cartridge;

initiating at least one error recovery technique based on the determined tape degradation; wherein initiating the at least one error recovery technique includes copying data from the degraded tape cartridge, erasing the degraded tape cartridge, and ejecting the erased degraded tape cartridge;

determining a number of scratch tape cartridges;

comparing the determined number of scratch tape cartridges to a threshold;

performing at least one administrative task based on the comparison of the determined number of scratch tape cartridges to a threshold;

obtaining tape drive mount statistics associated with a dismounted tape drive;

comparing the obtained tape drive mount statistics with a cleaning threshold;

mounting a cleaning cartridge based on the comparison between the obtained tape drive mount statistics and cleaning threshold;

cleaning the dismounted tape drive based on the mounting of the cleaning cartridge;

resetting a clean mount counter based on the cleaning of the dismounted tape drive;

comparing the obtained tape drive mount statistics with a maintenance threshold;

disabling the dismounted tape drive and performing administrative tasks based on the disabling based on the comparison of the obtained tape drive mount statistics with the maintenance threshold;

adjusting a priority of the dismounted tape drive based on a difference between a maximum priority of a tape drive and the product of the maximum priority of a tape drive and a ratio of the number of mounts of the dismounted tape drive to a maximum number of mounts of a tape drive based on the comparison of the obtained tape drive mount statistics with the maintenance threshold;

obtaining tape drive error statistics;

comparing the obtained tape drive error statistics with an error threshold;

disabling the dismounted tape drive based on the comparison of the obtained tape drive error statistics with the error threshold;

adjusting a priority of the dismounted tape drive based on a difference between a maximum priority of a tape drive and the product of the maximum priority of a tape drive and a ratio of the number of errors of the dismounted tape drive to a maximum number of errors of a tape drive based on the comparison of the obtained tape drive error statistics with the error threshold;

obtaining tape drive access routes of a tape drive;

determining whether all tape drive access routes are visible;

notifying the media management system of any invisible tape drive access routes based on the determination of whether all tape drive access routes are visible; and notifying the media management system of any alternate routes.

* * * * *